Oct. 22, 1968 TAKASHI ISHIDATE 3,407,392

STORAGE ELEMENT LOCATION COMPENSATION IN MATRIX MEMORIES BY A DELAY MEANS

Filed Dec. 27, 1963 5 Sheets-Sheet 1

INVENTOR.
TAKASHI ISHIDATE

BY Hopgood & Calimafde
ATTORNEYS

Oct. 22, 1968 TAKASHI ISHIDATE 3,407,392

STORAGE ELEMENT LOCATION COMPENSATION IN MATRIX MEMORIES BY A DELAY MEANS

Filed Dec. 27, 1963

5 Sheets-Sheet 2

INVENTOR.
TAKASHI ISHIDATE

Hopgood & Calimafde
ATTORNEYS

INVENTOR
TAKASHI ISHIDATE
BY Hopgood & Calimafde
ATTORNEYS

INVENTOR.
TAKASHI ISHIDATE
BY
Hopgood & Calimafde
ATTORNEYS

INVENTOR.
TAKASHI ISHIDATE
BY Haseltine & Calimafde
ATTORNEYS

United States Patent Office 3,407,392
Patented Oct. 22, 1968

3,407,392

STORAGE ELEMENT LOCATION COMPENSATION IN MATRIX MEMORIES BY A DELAY MEANS

Takashi Ishidate, Minatoku, Tokyo, Japan, assignor to Nippon Electric Company Limited, Minatoku, Tokyo, Japan, a corporation of Japan Filed Dec. 27, 1963, Ser. No. 333,829
12 Claims. (Cl. 340—173)

ABSTRACT OF THE DISCLOSURE

In a read-write arrangement for matrix memories which includes storage elements arranged in an array and each coupled to word and digit conductors, the location of the elements within the array, and hence the distance which signals must travel, and their attendant delay, are compensated by variable delay circuits under control of the word address selection circuits for variably delaying the application of control pulses to the read-write circuits in accordance with the position of the word address selected.

This invention relates to the compensation for storage element location when reading and writing in a random access two or three dimensional high speed memory.

In conventional read-write arrangements for matrix memories, where write-in is of the coincident or half current type and reading is performed by a singularly derived current, the timely superposition of write pulses at the selected memory element or elements (during write-in) and the signal to noise ratio (during read-out) have recently become major problems. This is largely as a result of the short duration drive pulses necessitated by the increasing speed and capacity demanded of the store.

In the conventional coincident writing system, previously alluded to, write-in is performed for example by operating an address selecting driver circuit (word or row driver) and an information driver (digit or column driver) at a predetermined time such that the produced currents, each of which is half that necessary to trigger the memory element, superpose at a crossing or crossings in the matrix. When, however, short pulses are employed, in order to raise the speed of operation, the resultant variation in time delay between coordinate pulses becomes significant. This variation occurs as a result of the fact that the distance the current must flow in the information write-in wire or conductor, from driver to storage element, depends upon the address selected, whereas the distance from the word driver to the selected element is independent of this parameter. Hence when employing pulses of short duration a timely coincidence of coordinate pulses is not obtained from all addresses.

In conventional read-out, on the other hand, in which a signal amplified by means of a read-out amplifier is gated at a predetermined time after the generation of the driving pulse (to improve the $S/N$ ratio) an analogous problem arises. That is, the signal propagation time from the selected element will not be constant, but will depend upon the selected address and its distance from the read-out amplifier.

It is therefore the object of this invention to provide a read-write arrangement for a high speed random access memory matrix, employing read-write pulses of short duration which internally compensates for the storage element location.

Briefly, the invention is predicated upon the concept of varying the time of operation, of read and write associated circuitry, in direct dependency upon the address selected.

The above mentioned and other features and object of this invention and the manner of attaining them will become more apparent and the invention itself will best be understood by reference to the following description of embodiments of the invention taken in conjunction with the accompanying drawings wherein:

FIG. 1 illustrates a conventional read-write arrangement for a two-dimensional matrix;

FIGS. 2(*a*) and 2(*b*) show waveforms at select locations within FIG. 1, for short pulse applications of write and read, respectively;

FIG. 4(*b*) shows an arrangement wherein the delay circuit of FIG. 4(*a*) may be employed for both read and write;

Figure 5A:
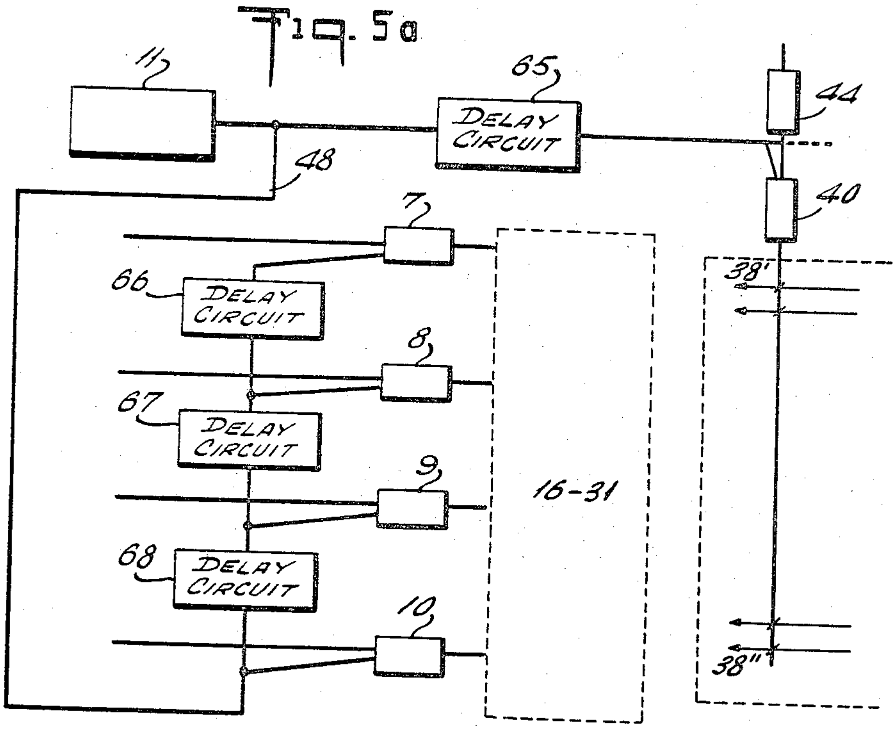
Figure 5B:
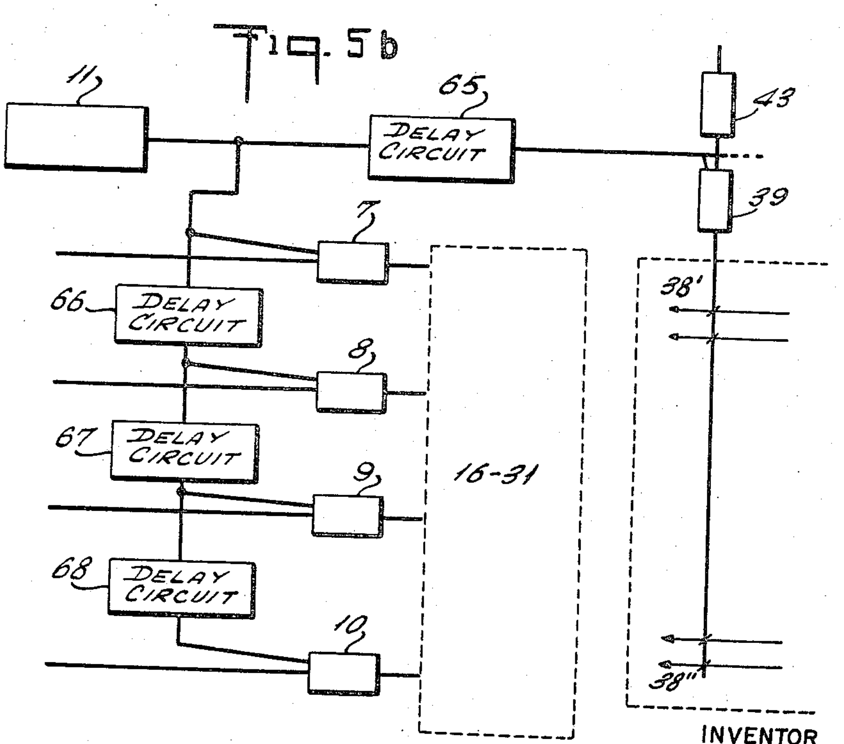
Figure 6:
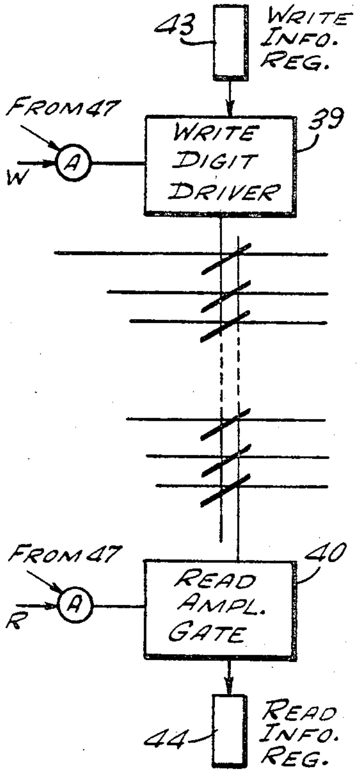
Figure 7:
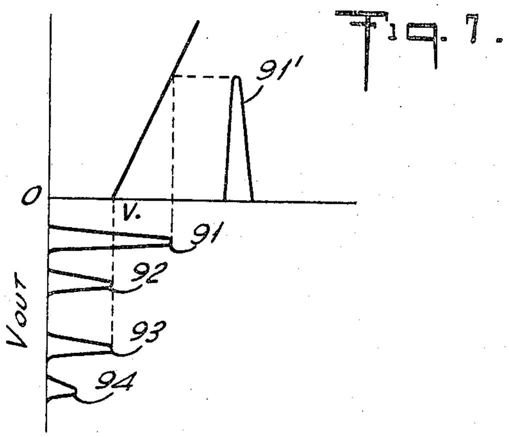
Figure 8A:
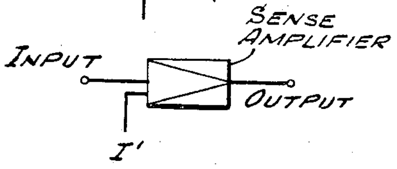
Figure 8B:
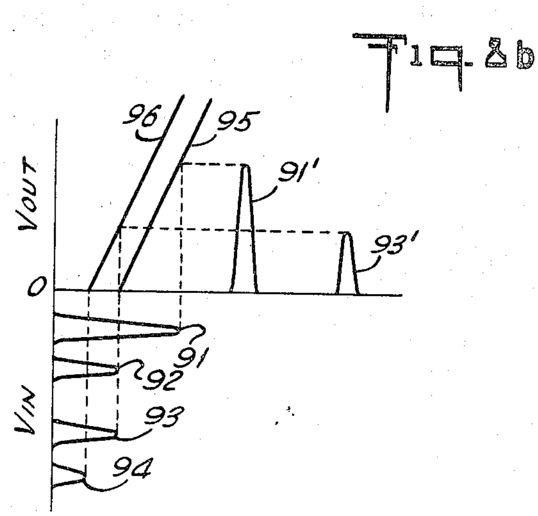
Figure 9A:
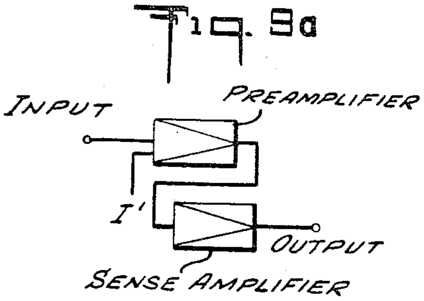
Figure 9B:
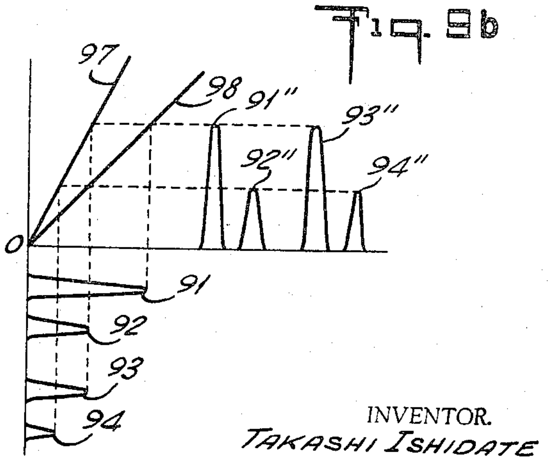

FIGS. 5(*a*) and 5(*b*) illustrates further embodiments of the invention directed to the read and write phases, respectively;

FIG. 6 illustrates an alternative matrix arrangement employing two digit wires per core;

FIG. 7 is a graphic representation of the characteristics of a conventional sense amplifier;

FIGS. 8(*a*) and 8(*b*) illustrate an arrangement, and a graphic representation of the characteristics thereof, respectively, of a sense amplifier in accordance with the invention; and FIGS. 9(*a*) and 9(*b*) illustrate an alternative arrangement, and graphic representation of the characteristaics thereof, respectively, embodying a preamplifier in the sense amplifier stage.

Figure 10A:
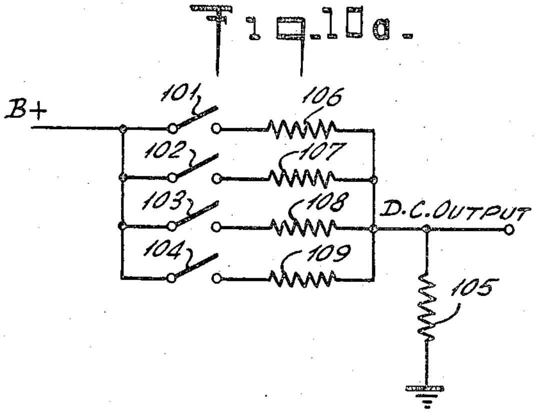
Figure 10B:
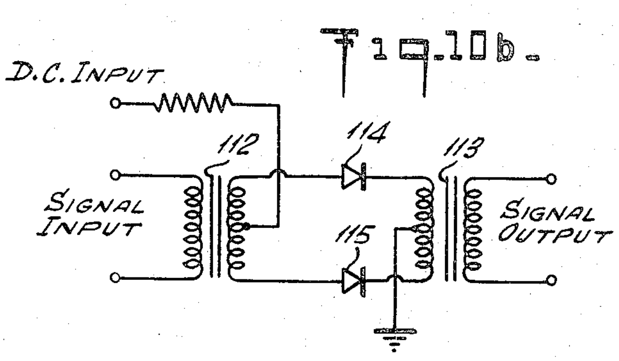
Figures 10C, 10D:
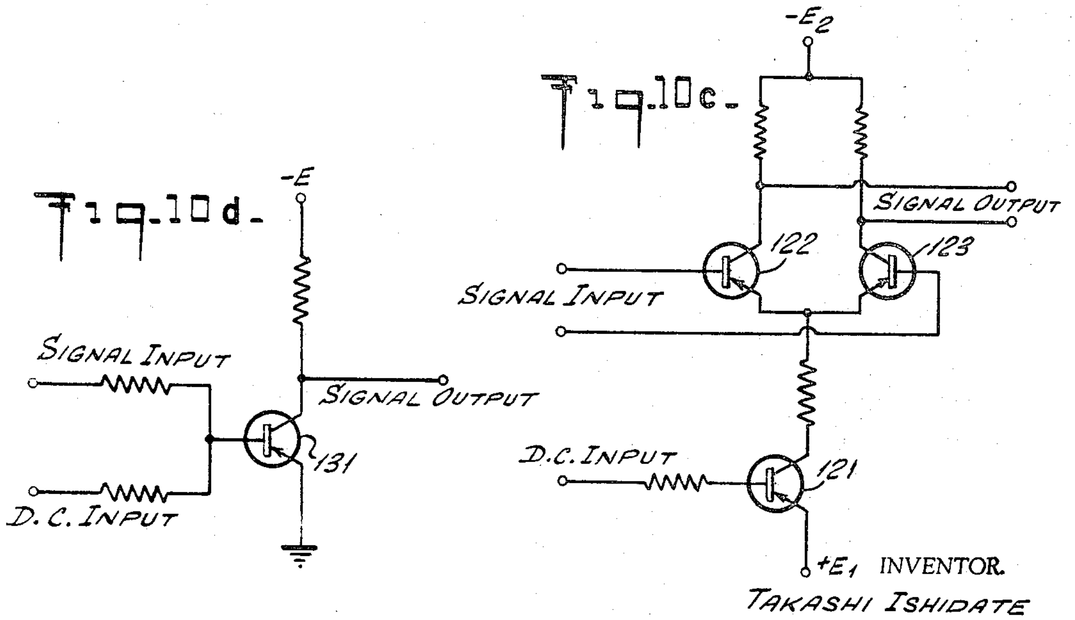

FIGS. 10(*a*) through 10(*d*) illustrate arrangements for effectuating the sense amplifiers and characteristics thereof depicted in FIGS. 8(*a*) through 9(*b*).

In order to lay a proper foundation for understanding the invention a conventional read-write arrangement for a two dimensional random access ferrite core matrix will first be explained with reference to FIG. 1.

The matrix 32 consists of cores arranged to store sixteen words of four bits each. Threading each core is a row (word) wire and column (digit) wire. Word selection and drive is performed as follows. Address registers 1 to 4, whose conditions are determined by adjunct equipment (not shown) feed the decoder circuits 5 and 6. The two decoder circuits convert binary information received from the registers to a one out of four code; each decoder thus selecting one output whose potential differs from the other three. The selected driving pulse generating circuit of circuits 7 to 10 generates a pulse at a fixed time determined by the control pulse generator 11. Four of the coincidence circuit elements 16 to 31, each of which may simply consist of a transformer and diode in circuit, are thus affected. However, only one, that selected by the decoder 6, via the corresponding continuity circuit of circuits 12 to 15, couples the drive pulse to the corresponding matrix word.

Simply stated, word selection is in compliance with the binary state of the registers 1 to 4. A more detailed explanation of the above may be found in "A Digital Store Using a Magnetic Core Matrix," Proc. of the I.E.E., 1956, Part B Suppl. 2 pp. 295–301. In the foregoing description no attempt has been made to distinguish address selection during read and write. It will be appreciated, however, that the selection is the same, the only difference lying in the polarity and value of the current applied to the row wires; that is, while saturation is required during read only approximately half that value is required for write, the rest of the current being furnished by the column wires. The R and W inputs, indicated in FIG. 1 as being applied to the driving pulse generating circuits, are therefore energized (not shown) during the associated operation to cause these circuits to furnish either read or write currents.

Turning now to the column or digit wires the write operation will first be explained. During the write phase the inputs W to the "And" gates A are energized by the write instruction (not shown). Delay circuit 47 may now operate the write digit drivers 39 to 39''' with a predetermined time delay after the driving pulse generating time. The digit drivers transfer, in the form necessary to operate the cores, the information stored in the write information registers 43 to 43'''. In the conventional system the delay time imposed by 47 is fixed and is previously determined to insure average coincidence of the write pulses at the selected cores.

Figure 1:
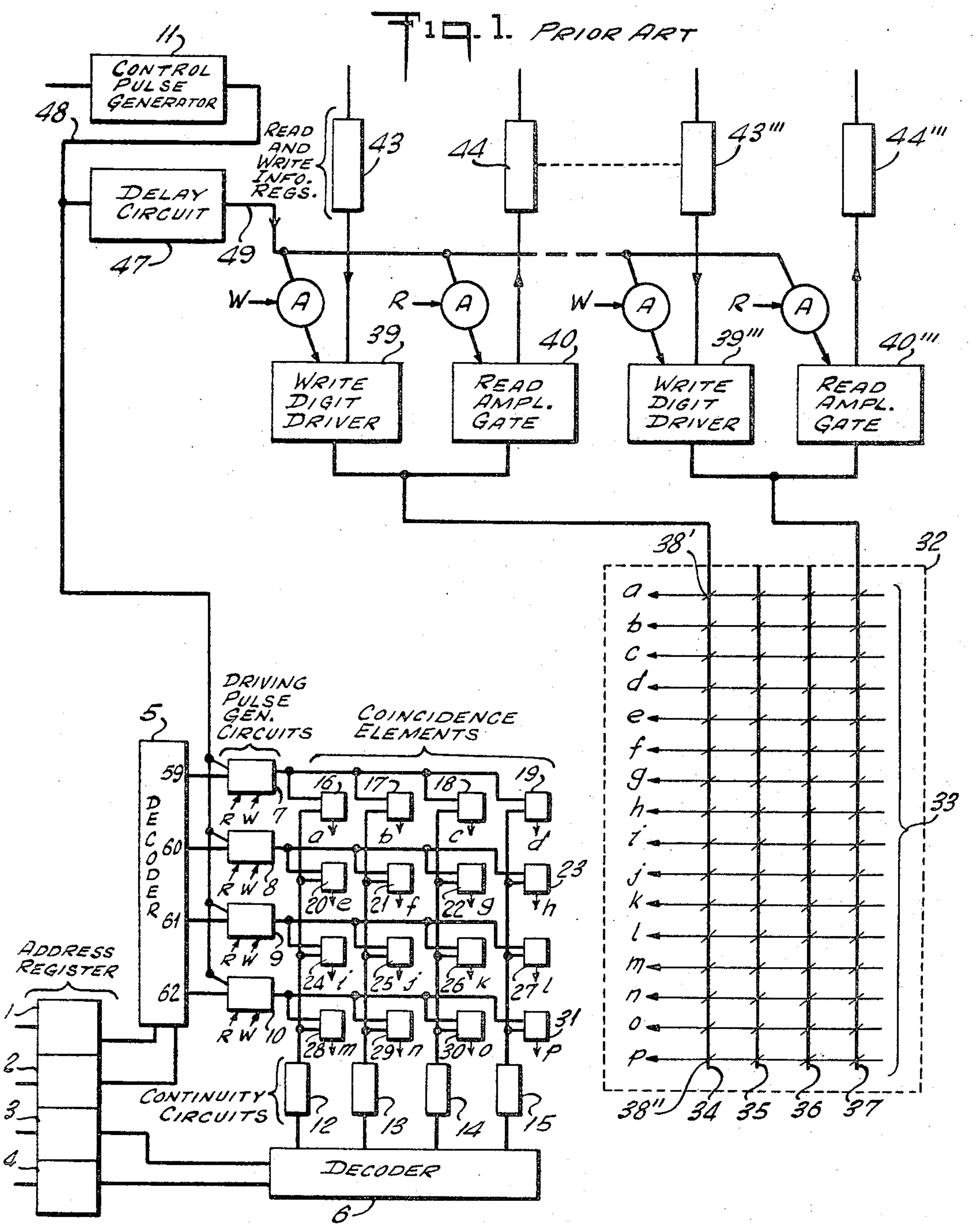
FIG. 1. PRIOR ART
Figure 2A:
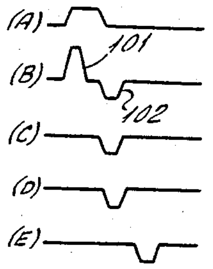
FIG. 2a PRIOR ART
Figure 2B:
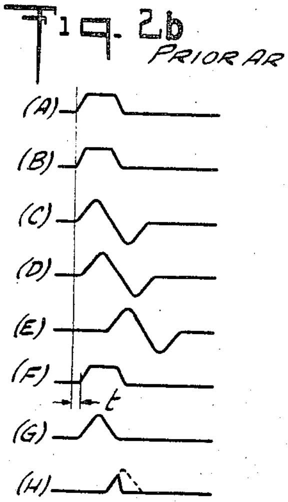
FIG. 2b PRIOR ART

FIG. 2(*a*) illustrates the waveforms at select locations within FIG. 1 when pulse durations are assumed to be short, compared with the effective transfer time of the current, and coincident writing is impossible. In FIG. 2(*a*) waveform A is the voltage waveform on the output wire 48 of the control pulse generator 11. Waveform B, which resembles a differentiated A, is supplied to the matrix over one of the row wires *a* to *p* depending upon the coincidence circuit element operated by the decoders. The current of positive direction, indicated by 101, is used for reading whereas the negative waveform, indicated by 102, is employed for writing (the selection being made by R and W as previously mentioned). No appreciable time difference exists between A and B and the time relation between these waveforms remains constant irrespective of the selected address. The waveform C represents the writing pulse current flowing through the digit wire, observed at the output terminals of the write driving circuits 39 to 39''' and coincides to 102 of the waveform B with respect of time.

Now, let us observe the particular memory elements 38' and 38''. The information writing current generated in 39 reaches 38' and 38'', respectively, through the digit wire 34. As is shown in FIG. 1, the distance between 39 and 38' is short while the distance between 39 and 38'' is long, and therefore, the information writing current at the memory element 38' approximately coincides in time with the write driving pulse, as shown in D of FIG. 2(*a*). The current at the memory element 38'' on the other hand is delayed and appears as illustrated in E of FIG. 2(*a*). That is, at the memory element 38', located adjacent the digit driver, the information writing pulse current and the address selecting pulse coincide and coincidence writing may be performed correctly, whereas, at the element 38'' which is located far from the digit driver, it is impossible to perform coincidence writing because the information writing pulse does not appear at the same time.

During the read operation the result is similar. During the read phase wires 34 through 37 are read-out wires which transfer signals, occurring as a result of one of the row wires being pulsed in response to the states of the decoders 5 and 6, to the read-out amplifier-gates 40 to 40'''. Circuits 40 to 40''' transfer their outputs to the read information registers 44 to 44''' at a predetermined time after the driving pulse generating time. The gating action in these circuits effectively suppresses noise emanating from the matrix on both sides (with respect to time) of the signal. Circuit 47 produces a predetermined time delay and is employed to gate the circuits 40 to 40'''. It is to be noted that the time delay appropriate for this function may or may not suffice (depending upon the sophistication of the various circuits) for the write operation and vice versa. Where it is desirable to introduce different time delays for read and write this may be easily accomplished by switching delay circuits in response to a read or write instruction.

FIG. 2(*b*) illustrates the waveforms at select locations within FIG. 1 when the pulse durations are assumed to be short visa-vis the propagation time of a read-out signal, and read-out signal selection is impossible. In this figure waveforms A and B are similar (except as noted) to those shown in FIG. 2(*a*) and are similarly derived. In B the read pulse only is shown, on an expanded scale.

In FIG. 1, let us again observe the particular memory elements 38' and 38'' which are located near and far from the read-out amplifier gate, respectively. C of FIG. 2(*b*) shows an example of a read-out signal from a memory element, generated by waveform B. Inasmuch as the circuit for detecting the read-out signal is amplifier-gate 40, the read signals produced by the memory elements 38' and 38'' must travel through read-out wire 34. As previously mentioned the distance between 38' and 40 is short while the distance between 38'' and 40 is long; therefore, the read-out signals presented to the read-out amplifier-gate 40 are as shown in D and E, respectively. F of FIG. 2(*b*) is the voltage waveform on the output wire 49 of delay circuit 47 and shows the gating pulse waveform for signal selection. The time delay ($t$) is that introduced by means of the delay circuit. G and H of FIG. 2(*b*) are the output waveforms of circuit 40, in which G shows the result of waveform D being gated, while H shows the result of waveform E being gated. As will be clear from FIG. 2(*b*), although the output from the memory element 38' located adjacent the read-out amplifier-gate is gated correctly by the gating signal, the output from the element 38'' located some distance from the read-out amplifier-gate is derived as an incomplete signal owing to its noncoincidence with the gating signal.

In order to obviate the above effects of core location this invention provides an arrangement wherein the selected address is employed to vary particular parameters, as will be described with reference to the remaining figures.

Figure 3:
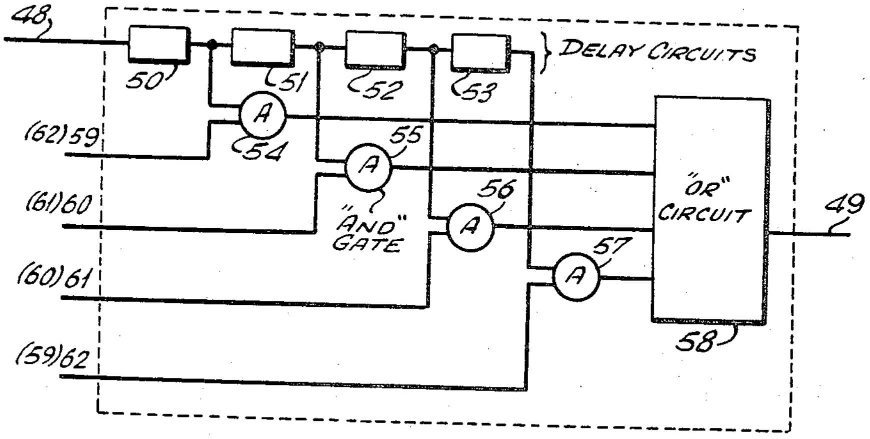
FIG. 3 illustrates an embodiment of the invention incorporating a four-group breakdown in the column direction.

FIG. 3 illustrates one embodiment of the invention in which the delay introduced by the delay circuit 47 of the conventional system is directly dependent upon the group of addresses selected by decoder 5 of FIG. 1. The numbers 59 through 62 correspond to the similarly denoted outputs of the decoder 5 and it is to be noted they are in both true and inverse order. The normal order relates to the read operation while the inverse order (in parenthesis) pertains to the write phase.

The gating signal which appears over lead 49 initiates the digit drivers during the write phase and triggers the read-out amplifier-gates during the read phase. The gating signal originating over lead 48 from the control pulse generator, is transmitted through one to four delay circuits (50 through 53) as determined by the "And" gates 54 to 57. The "And" gates are in turn controlled by the decoder outputs, only one of which is energized at a time as was mentioned.

Since, as was previously seen, the read signal arriving over the digit wires has a time lag which varies inversely to the word group *a–d*, *e–h*, *i–l*, and *m–p* locations and since decoder outputs 59–62 directly control these groups, it is possible with the arrangement of FIG. 3 to introduce a compensating time delay to the pulse controlling the read-out amplifier-gates (controlled via line 49). Thus for example when decoder output 62 is energized one of the words *m–p* is driven via the driving pulse generator circuit 10 of FIG. 1. As these words are the farthest removed from the read-out amplifier-gates the propagation time of the read-out signal is the greatest. The read-out amplifiers, however, are not gated until the arrival of the pulse over lead 49, and this pulse is correspondingly delayed since it must travel through each of the four delay circuits.

During write-in the situation is reversed. Now the pulses are supplied to the digit wires (by the digit drivers) instead of emanating from them. The direction of propagation in the digit wire is from *a* to *p* rather than *p* to *a* and the delays introduced by the circuit 47 must be reversed with respect to the addresses selected by the decoder 5. Hence the reversal in FIG. 3 of the decoder outputs for read and write.

The same or separate delay circuits may be employed for the read and write phases. The former alternative will be described with reference to FIGS. 4(*a*) and 4(*b*). Where separate delay circuits are desired they may be connected in common to leads 48 and 49 and one or the other brought into circuit in response to a read or write instruction.

Figure 4B:
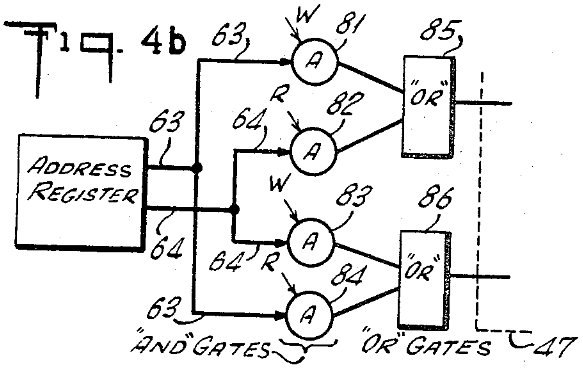
FIG. 4(*a*) illustrates an alternative embodiment of the invention incorporating a two-group breakdown in the column direction.
Figure 4A:
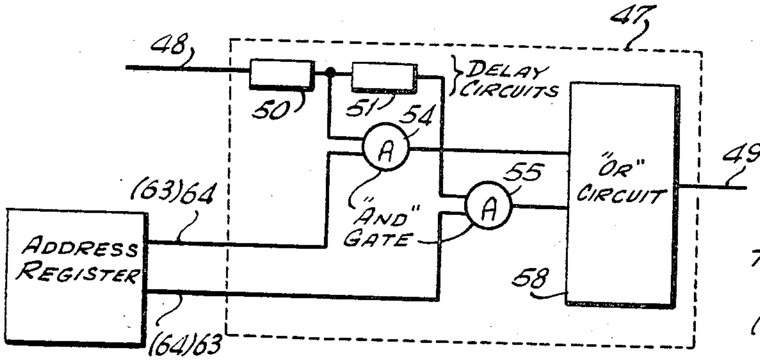

FIG. 4(*a*) illustrates an alternative embodiment wherein the word addresses are grouped into two groups rather than the four shown in FIG. 3. In this figure the delay introduced is controlled by the address register representing the most significant digit rather than by the decoder. Leads 63 and 64 represent the true and complement output wires respectively of the register (in FIG. 1 only one lead is shown for simplicity) and as was the case with FIG. 3 the numbers in parenthesis are for the write phase while the other set of numbers is for the read phase.

The operation of this circuit is similar to that of FIG. 3 albeit simpler due to the rougher division of memory elements.

FIG. 4(*b*) illustrates an arrangement whereby one variable delay circuit may be employed for both read and write. The arrangement is an and/or logic circuit for reversing the address register outputs when switching from the read to write phase or vice versa. The switch is effected in response to a read (R) or write (W) instruction appearing at the inputs to "And" gates 81 and 84, and 82 and 83 respectively. "OR" gates 85 and 86 thus present the correct order of the leads to the delay circuit. A similar although more complicated arrangement for FIG. 3 will permit an analagous result in that embodiment.

FIGS. 5(*a*) and 5(*b*) illustrate further embodiments of the invention directed to the read and write phases, respectively. In these figures the operation is somewhat different than that described with respect to FIGS. 3 and 4 in that the time delay for gating the read-out amplifiers (during the read phase) and the time delay introduced in energizing the digit drivers (during the write phase) is fixed while the driving pulse generating circuits 7 to 10 are caused to vary in their response time to the control pulse generator. In both 5(*a*) and 5(*b*) corresponding numerals depict corresponding parts in FIG. 1.

In FIG. 5(*a*) the delay circuits 65–68 each have a fixed delay time, and are so adjusted that the sum of the delay times at 65 and the propagation time from 38″ through 40 is equal to the sum of the delay times at 65–69 plus the propagation time from 38′ through 40. Thus, the time in which the signal arrives at the read-out amplifier gate becomes constant without relation to the position of the memory element read out.

Similarly in FIG. 5(*b*) delay circuits 65–68 each have a fixed time delay. In this case delays are so adjusted that the total time delay in the delay circuits 66–68 is equal to the time during which the digit current propagates from the elements 38′ through 38″. Some mental arithmetic at this point will show that circuits 5(*a*) and 5(*b*) are equivalents and it is therefore possible to merely reverse the lead from delay circuit 66 to circuit 68 in order to effectuate a write to read conversion. This, of course, may be simply achieved, in response to read and write instructions, by arrangements well known in the art.

FIG. 6 illustrates an alternative arrangement in accordance with the present invention. In this arrangement the matrix itself is complicated by the constitution of each column or digit wire as a pair, coextensively threading the cores. The attendant circuitry, however, is simplified. As may be seen from the figure, the write (39 and 43) and read (40 and 44) associated circuits are oppositely disposed with respect to the matrix; each being connected to one of the pair of digit wires. While for simplicity only one column is depicted, it will be apreciated that the arrangement is redundant throughout the matrix. As a result, the propagation reversal previously alluded to between the read and write phases is obviated and hence, the same order of delays may be used for read and write; i.e. the numbers in parenthesis in FIGS. 3 and 4(*a*), and the arrangement shown in FIG. 5(*b*). In many cases it will also be possible to use not only the same order of delays but the same delays for read and write, thus obviating the necessity for any switching arrangement.

The read-out amplifier-gate of FIG. 1 is composed of two main parts: a gate circuit triggered by the control pulse transmitted via the delay circuit 47, and a sense amplifier. The latter, in conventional storage arrangements incorporates a fixed amplification factor (previously determined) and is generally provided, in order to discriminate signal from noise, with a threshold region below which an input signal produces no output.

Since the effective length of the read-out wire varies in dependent relation to the selected address, it therefore, in addition to introducing a propagation delay (as previously discussed), also variably attenuates the signal. As a result, a signal from an element located some distance from a sense amplifier is sometimes regarded as noise, by the threshold characteristic, and is not amplified. Alternatively, when the amplifier gain is adjusted so that a read-out signal from the furthest element exceeds the threshold, the noise from a memory element located adjacent the amplifier, when that element is selected, may have an amplitude greater than threshold and be regarded as a signal. FIG. 7 is illustrative of the former. In this figure, the input versus output characteristics of a conventional sense amplifier are depicted, with $V_0$ representing the threshold region below which the signal is suppressed. When a signal 91 and the noise 92 from a memory element adjacent the sense amplifier are applied thereto, the noise will be suppressed due to the threshold characteristic while the signal will be amplified and will appear as 91′. The signal 93 and noise 94, on the other hand, from a distant memory element, when that element is selected, will both be regarded as noise and suppressed. If the threshold voltage were to be reduced, for example, to a point just above wave 94, then, in reading an adjacent element the noise 92 would appear as a signal. Hence, such a solution is unsatisfactory.

FIGS. 8(*a*) and 8(*b*) illustrate an arrangement, and a graphic representation of the effect thereof, for obviating the above result. In FIG. 8(*a*), the sense amplifier is provided with an auxiliary input I′, for controlling the threshold characteristic of the amplifier in response to the selected address. This input may, for example, be connected to the address register output of FIG. 1, and its binary signals employed; or it may be constituted by four leads, each of which is directly connected to a decoder 5 output for utilizing the one out of four code derived there. Thus, by varying the threshold voltage, signal 91 may be amplified to 91′ (by employing the greater threshold characteristic 95) and the signal 93 may be amplified to 93′ (by employing the alternative threshold characteristic 96).

FIGS. 8(*a*) and 8(*b*) illustrate an alternative arrangement. In FIG. 8(*a*) a preamplifier is in inserted in circuit before the threshold sensitive sense amplifier. The preamplifier is provided with a variable amplification factor whose value may be shifted between 97 and 98 (FIG. 8(*b*)) by the auxiliary input I′; again in response to the selected address. Thus, more amplification is given distant signals and their accompanying noise (as shown by curves 93″ and 94″) than closer signals and noise (curves 91″ and 92″) and a conventional sense amplifier may be inserted in series, as shown, to give the desired result.

Where the gain and/or threshold level of the sense amplifier is to be controlled in accordance with the selected word address, as described with reference to FIGS. 8(*a*) through 9(*b*), the circuit of FIG. 10(*a*) may be employed to first perform a digital to analog conversion. In this figure, each of the decoder 5 outputs will control one of the four switches 101–104 (which may, of course, be electronic) to provide a D-C voltage at the output which is directly dependent upon the selected address. The values of resistors 105–109 are suitably chosen to give the desired voltage divider effect for each of the four possible address groups.

FIG. 10(*b*) illustrates an arrangement for employing the D-C voltage obtained in FIG. 10(*a*) to control the attenuation of the digit signal. Since both of the diodes 114 and 115 possess non-linear characteristics, an increase in the D-C voltage will decrease the respective diode impedances, and hence decrease the attenuation of a signal passing from input transformer 112 to output transformer 113. When FIGS. 10(*a*) and 10(*b*) are utilized in conjunction with one another the values of resistors 105–109 will be selected to produce an increasing output potential as the decoder 5 steps from leads 59 to 62, to maintain a substantially uniform signal and noise level, regardless of address.

FIG. 10(*c*) illustrates a circuit arrangement for controlling the gain (rather than the attenuation as in FIG. 10(*b*)) by a D-C voltage. With the arrangement of transistors shown, an increasing D-C potential at the base of transistor 121 will increase the current through this transistor and into the emitters of transistors 122 and 123; thus increasing the latter's amplification factors and hence the output signal level. When this circuit is employed in conjunction with FIG. 10(*a*), a similar order of resistor values will produce a like result.

It is to be noted that in both FIGS. 10(*b*) and 10(*c*) the control potential does not appear at the output and therefore does not interfere with the output signal.

While FIGS. 10(*b*) and 10(*c*) show methods for controlling the signal amplitude, FIG. 10(*d*) illustrates a simple arrangement for controlling the threshold level (again with a D-C voltage). In this circuit only that portion of the signal which exceeds the bias (D-C potential) is amplified by transistor 131 to emerge at the output.

Thus it may be seen that the control of gain and/or threshold level, described with reference to FIGS. 8(*a*) to 9(*b*), can easily be effected by suitably combining the circuits of FIGS. 10(*a*) to 10(*b*). It will be appreciated that each of the depicted circuits do not necessarily require the same values or polarity of D-C potentials. However, it is well within the realm of those versed in the art to make the necessary modifications to achieve the functional results described above.

It is to be noted that while the amplifiers and delay devices have been depicted as two or four-condition devices, it is possible to make them responsive to even further breakdowns in the linear direction of the column wires. This may be accomplished, for example, under control of both the decoders 5 and 6 of FIG. 1.

Although the above description has been limited to a random access two-dimensional matrix, the present invention has application to other systems such, for example, as a three-dimensional matrix, a code translating circuit, and a control signal generating circuit. Further, although the embodiment chosen to illustrate the invention depicts a ferrite core matrix, the invention is not so limited and has application to other elemental structures in matrix configuration.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. In a read-write arrangement for a matrix memory including an array of storage elements each of which is coupled to word and digit conductors common to a plurality of word and digit related storage elements respectively, the improvement therein for compensating for the location of storage elements within the matrix comprising in combination: means for applying read and write pulses to said word conductors; word address selecting means, coupled to said pulse means, for controlling the application of read and write pulses to said word conductors; read means, coupled to each of a plurality of said digit conductors, for amplifying and gating the signals thereon; write means, coupled to each of a plurality of said digit conductors, for applying pulses thereto; a control pulse generator coupled to said word conductor pulse applying means for the initiation thereof; a variable delay circuit under control of said address selecting means and connected between said control pulse generator and said read and write means for controlling the timing of said read and write means in accordance with the word address selected.

2. The improvement claimed in claim 1 in which said digit conductors each comprise a pair of conductors, and in which the write means are coupled to one conductor in each pair at one end thereof, and the read means are coupled to the other conductor in each pair at the other end thereof.

3. The improvement claimed in claim 1 in which the read and write means are coupled in common to each of said digit conductors.

4. The improvement claimed in claim 3 in which said variable delay circuit comprises two parts, responsive to read and write instructions, respectively.

5. The improvement claimed in claim 3 in which said variable delay circuit comprises a logic circuit, responsive to read and write instructions, for inverting the control of said address selecting means.

6. In a read-write arrangement for a matrix memory including an array of storage elements each of which is coupled to word and digit conductors common to a plurality of word and digit related storage elements respectively, the improvement therein for compensating for the location of storage elements within the matrix comprising in combination: means for applying read and write pulses to said word conductors; word address selecting means, coupled to said pulse means, for controlling the application of read and write pulses to said word conductors; read means, coupled to each of a plurality of said digit conductors, for amplifying and gating the signals thereon; write means, coupled to each of a plurality of said digit conductors, for applying pulses thereto; a control pulse generator coupled to said word conductor pulse applying means for the initiation thereof; delay means interposed in increasing predetermined value, depending upon the word address, between said word conductor pulse applying means and said pulse generator; and fixed delay means connected between said read and write means and said control pulse generator.

7. In a read arrangement for a matrix member including an array of storage elements each of which is coupled to first and second conductors common to a plurality of coordinately related storage elements, and in which readout is performed by impressing a read pulse on a first conductor and reading the derived signals on the second conductors, the improvement therein for compensating for the location of storage elements within the matrix comprising in combination: address selecting means for determining said first conductor to which a read pulse is to be applied; a read amplifier-gate coupled to each said second conductors; means under control of said address selecting means and coupled to each of said read amplifier-gates for controlling the operation thereof in accordance with the address selected; a control pulse generator for initiating the first conductor read pulses; the means under control of said address selecting means comprising a variable delay circuit connected between said control pulse generator and said read amplifier-gates for effecting the gating thereof with a delay dependent upon the selection means.

8. The improvement claimed in claim 7 in which said read amplifier-gate comprises a variable threshold sense amplifier, the threshold characteristic of which is under control of the address selecting means.

9. The improvement claimed in claim 7 in which said read amplifier-gate comprises a threshold sense amplifier and a serial preamplifier having a variable amplification factor, the amplification factor of which is under control of the address selecting means.

10. In a write arrangement for a matrix memory including an array of storage elements each of which is coupled to first and second conductors common to a plurality of coordinately related storage elements and in which write-in is performed at a selected element by the coincidence of pulses on the associated first and second conductors, the improvement therein for compensating for the location of storage elements within the matrix comprising in combination: address selecting means for determining said first conductor to which a write pulse is to be applied; first and second conductor write pulse means; a control pulse generator for initiating the first and second conductor write pulse means; and variable delay means connected to said control pulse generator and under control of said address selecting means for adjusting the time relationship between the first and second conductor write pulses in accordance with the selected address.

11. The improvement claimed in claim 10 in which said variable delay means is connected between said control pulse generator and said second conductor write pulse means.

12. The improvement claimed in claim 10 in which said variable delay means is connected between said control pulse generator and said first conductor write pulse means; said improvement further comprising a fixed delay circuit connected between said control pulse generator and said second conductor write pulse means.

References Cited

UNITED STATES PATENTS

| | | | |
|---|---|---|---|
| 2,825,889 | 3/1958 | Henle | 340—173 |
| 3,032,749 | 5/1962 | Newhouse | 340—174 |

TERRELL W. FEARS, *Primary Examiner.*